Dec. 4, 1956 R. R. HALIK 2,773,016
METHOD OF FEEDING GASEOUS HYDROCARBONS IN A
MOVING BED HYDROCARBON CONVERSION PROCESS
Filed Feb. 25, 1953 3 Sheets-Sheet 1

INVENTOR.
Raymond R. Halik
BY
Andrew L. Jaboriault
AGENT

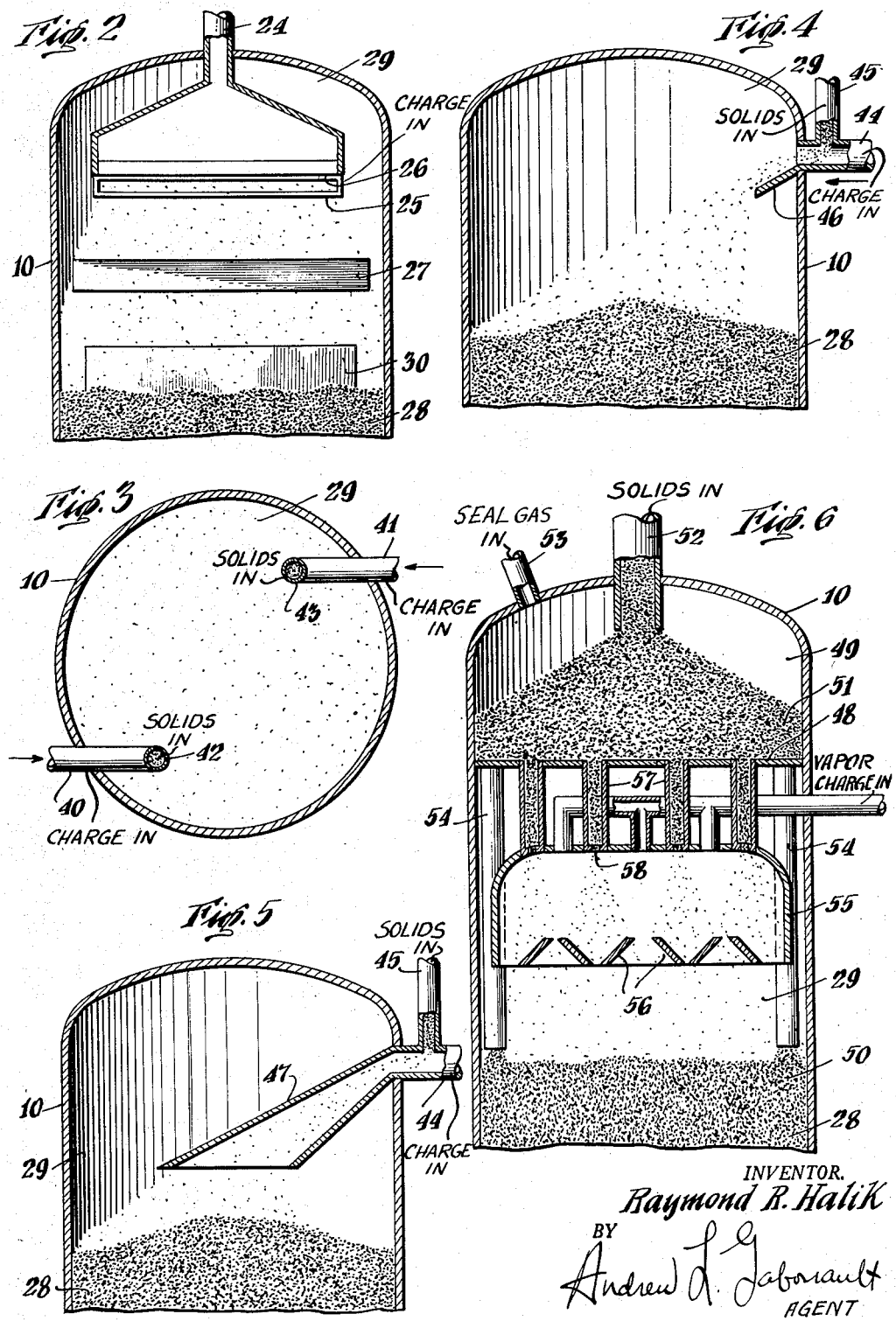

Dec. 4, 1956 R. R. HALIK 2,773,016
METHOD OF FEEDING GASEOUS HYDROCARBONS IN A
MOVING BED HYDROCARBON CONVERSION PROCESS
Filed Feb. 25, 1953 3 Sheets-Sheet 3

INVENTOR.
Raymond R. Halik
BY
Andrew L. Jaboriault
AGENT

United States Patent Office 2,773,016
Patented Dec. 4, 1956

2,773,016

METHOD OF FEEDING GASEOUS HYDROCARBONS IN A MOVING BED HYDROCARBON CONVERSION PROCESS

Raymond R. Halik, Pitman, N. J., assignor to Socony Mobil Oil Company, Inc., a corporation of New York Application February 25, 1953, Serial No. 338,771

15 Claims. (Cl. 196—52)

This invention is concerned with a process for the conversion of gaseous reactants in the presence of a moving mass of granular contact material which may or may not exhibit catalytic properties with respect to the conversion reaction. It is particularly concerned with a process for effecting uniform conversion of the gaseous reactant where reactant and contact material are supplied to the moving mass at substantially different temperatures.

Typical of the processes to which this invention applies is the catalytic conversion of a high boiling vaporized hydrocarbon charge to lower boiling products by passing the charge downwardly through a downwardly gravitating, substantially compact bed of granular adsorbent catalytic material at temperatures of the order of 850° F. and upwards. Other exemplary processes include the catalytic reforming, desulfurization, isomerization, and the like, of a vaporized hydrocarbon in the presence of a suitable granular catalyst and the thermal cracking, coking, visbreaking, and the like, of a vaporized hydrocarbon by contact with a heated inert contact material.

Suitable contact material may vary widely in nature, depending on the particular process to which this invention is applied. For example, suitable contact material which is catalytic in nature may partake of the nature of natural or treated clays, bauxite, activated alumina or synthetic association of silica, alumina or magnesia, or combinations thereof to which certain metallic oxides or sulfides may be added in small amounts for specific purposes. Contact material which is inert in character may partake of the form of refractory materials, such as zirkite, corhart or mullite or it may partake of the form of stones or metallic particles or balls. In any case, it is desirable to maintain the contact particles within the size range one inch to 30 mesh and preferably 3 to 14 mesh by Tyler Standard Screen Analyis. The term "granular" is used in describing and claiming the invention to refer to particles of palpable particulate form, like those of the above sizes, as distinguished from finely divided powders, whether of regular shape such as pellets, tablets, or spheres or irregular shape such as obtained from grinding and screening operations.

In processes of the aforementioned types, it is usual to maintain a substantially compact bed of contact material within a confined conversion zone with a gas plenum space above the bed in open communication therewith to which the gaseous reactants are supplied. Used contact material is removed from the lower section of the bed while fresh contact material is supplied to the upper surface of the bed at one or more points of restricted area. The gaseous reactant, at a temperature substantially different than the contact material supplied to the bed, passes into the upper end of the bed and downwardly therethrough to effect the desired conversion reaction. Such a system results in cross-flow of contact material and reactant at the upper end of the bed which in turn leads to a temperature gradient across the bed, resulting in uneven conversion of the gaseous reactant. This will be best understood by considering, as an example, a hydrocarbon conversion system operated in the above manner. In such a system it is usually necessary to introduce the vaporized hydrocarbon charge, which may be the total charge or only a portion thereof, to the conversion zone at temperatures substantially below the optimum conversion temperature. This is necessary because the optimum conversion temperature is ordinarily above the temperature at which the vaporized charge undergoes thermal decomposition, and in order to obtain the best quality product such thermal decomposition must be avoided in the vapor charge preheater. Therefore, the heat required to raise the temperature of the vaporized charge from the level to which it can be heated in the preheater without thermal decomposition to the optimum conversion temperature will normally be supplied by the contact material charged to the conversion zone. In addition, the heat required by the conversion reaction, which is normally endothermic, is usually supplied by this contact material. Therefore, contact material supplied to the conversion zone will necessarily be at a temperature substantially above the temperature of the vaporized charge supplied to the conversion zone. This temperature differential may be as much as several hundred degrees. Where the contact material is supplied to the upper surface of the bed as a single central stream of restricted area, as is frequently the case, the upper surface of the bed will assume the shape of a cone with apex at the bottom of the supply stream and sides sloping downwardly and outwardly at angles with the horizontal equal to the angle of repose of the contact material. The angle of repose is normally within the range about 25 to 45 degrees with the horizontal. For most commercially used contact materials it is about 30 degrees. The vaporized charge is supplied to the plenum space which is above the bed and in open communication therewith and enters the upper end of the bed. Some of the contact material from the supply stream passes directly into the bed in the area directly beneath the supply stream but a major portion of the contact material passes outwardly across the upper end of the bed as a transversely flowing layer to supply the portions of the bed not lying directly beneath the supply stream. The upper side of this layer forms the upper surface of the bed and particles from the layer enter the main body of the bed wherein the flow of particles is substantially unidirectionally downward. The cooler vaporized charge entering the bed passes first through this transversely flowing layer and acts to cool the particles therein. No temperature equilibrium is reached since the transverse layer flows across the vapor stream. Any given particle in the layer will therefore be cooled an amount depending on its distance of travel in the layer before entering the main body of the bed. This results in a temperature gradient across the bed, with a maximum temperature directly below the supply stream and a minimum temperature at the outer edges of the bed. This variation in temperature may be as much as several hundred degrees. Substantially the same effect occurs where contact material is supplied to several widely spaced-apart restricted areas, except that there will be several points of maximum and minimum temperature. The temperature gradient results in varying degrees of conversion in various laterally spaced-apart regions of the column with probable over-conversion beneath the supply stream and under-conversion in regions beneath the outer edges of the conical pile. It might be thought that the temperature across the column would tend to become uniform shortly below its upper surface due to interchange of contact material across the column between high and low temperature regions. It has been found that the degree of such interchange is slight so that there is still a marked temperature gradient across the column at its lower end. It would also seem that there should be interchange of vapors across the column between high and low temperature regions which would tend to minimize the uneven conversion in the two sections by subjecting any given unit of charge for a part of its passage through the column to high temperature contact material and for the remainder to lower temperature contact material. It has been found, however, that the expected interchange of vapors through the column does not occur to any great extent. It might further be expected that heat transfer between contact material particles across the bed would tend to equalize the temperature in the lower sections of the bed. The rate of heat transfer between contact material particles is so low, however, that this does not occur.

Where the process is one in which the gaseous reactants are at a higher temperature than the contact material the situation is reversed. The low temperature point is beneath the contact material supply stream while the high temperature point is near the outer edge of the contact material bed. The undesirable results are obviously the same, however.

A major object of this invention is to provide a process for the conversion of gaseous reactants in the presence of a moving contact material mass which overcomes the above described difficulties.

Another object of this invention is to provide a process for the conversion of vaporized hydrocarbon charge uniformly to lower boiling products.

A further object of this invention is to provide a method for supplying contact material to processes for the conversion of substantially entirely vaporized hydrocarbon charge to lower boiling products by passing the charge downwardly through a downwardly moving, substantially compact column of granular contact material whereby the temperatures across the contact material column will be substantially the same at any given level within the column.

These and other objects of the invention will be apparent from the following discussion of the invention.

This invention discloses a continuous process for the conversion of a gaseous reactant wherein a downwardly moving, substantially compact column or bed of granular contact material is maintained within the lower section of a confined conversion zone with a gas plenum space thereabove in the upper section of the conversion zone. Fresh contact material is gravitated into a mixing zone which is located at a level substantially above the upper surface of the column either within the conversion zone or exterior thereto. The reactant charge, substantially entirely gaseous and at a temperature substantially different from the temperature of the contact material, is also passed into the mixing zone and mixed with the contact material therein so that the temperatures of the reactant and contact material become substantially the same or equal. The mixture is then passed downwardly through the plenum space and onto the upper surface of the contact material column in the conversion zone. The charge is then passed through the column to effect the desired conversion. The term "gaseous" is used herein in describing and claiming this invention to mean a material in the gaseous phase at its existing temperature and pressure regardless of its phase at normal temperature and pressure.

This invention will be best understood by referring to the attached drawings, of which Figure 1 is an elevational view, partially in section, showing the application of this invention to a hydrocarbon conversion process.

Figure 2 is a sectional view taken along line 2—2 of Figure 1.

Figure 3 is a sectional view of another apparatus capable of utilizing this invention.

Figure 4 is an elevational view, partially in section, of the upper section of a conversion vessel employing a further form of this invention.

Figure 5 is an elevational view, partially in section, of a reactor employing a further modified form of this invention.

Figure 6 is an elevational view, partially in section, illustrating the application of still another form of this invention to a reaction vessel.

All of these figures are diagrammatic in form and like parts in all bear like numerals.

Figure 1:
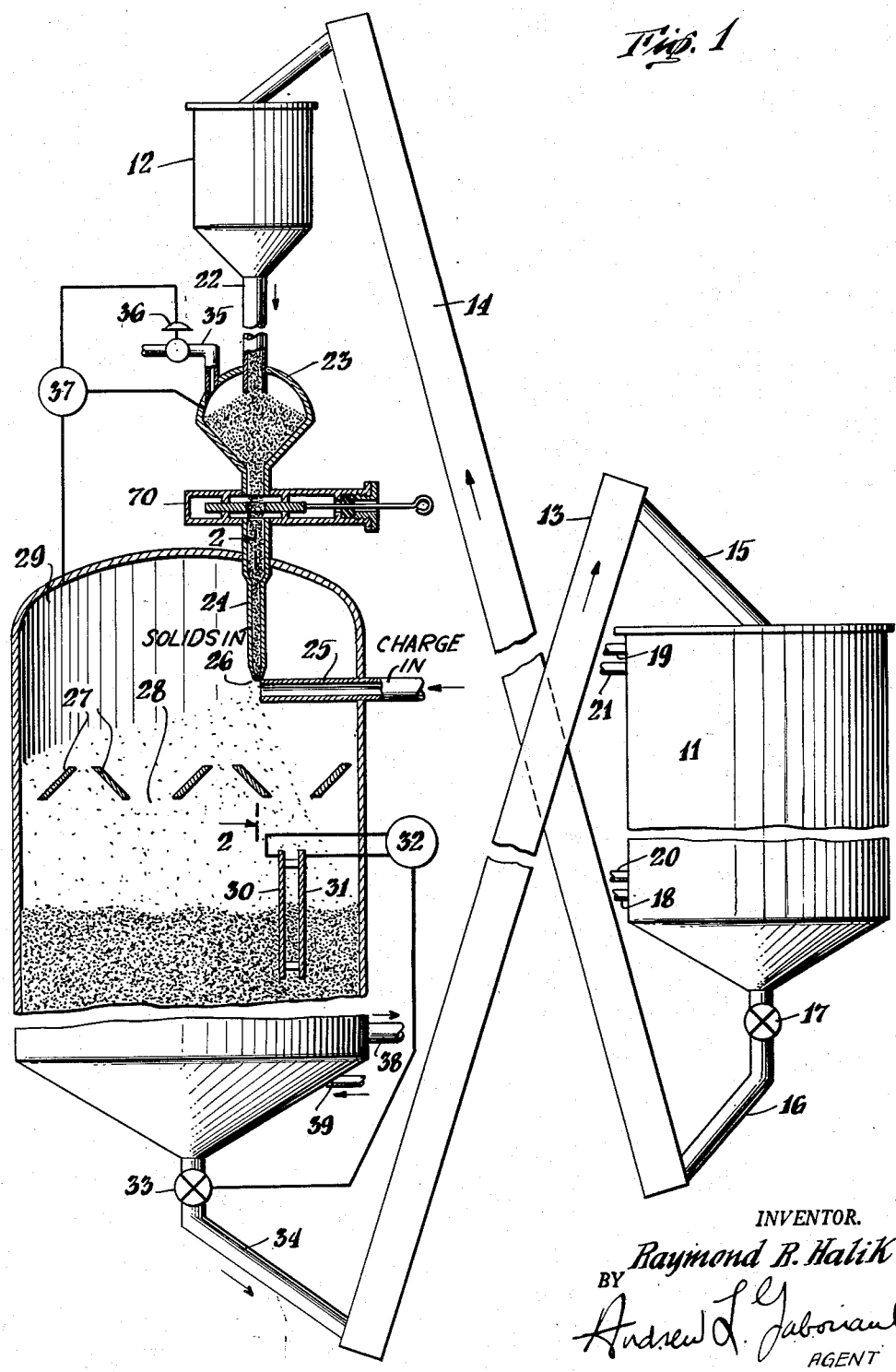

Turning to Figures 1 and 2, which will be considered together and illustrate the application of this invention to a hydrocarbon conversion system, there is shown therein a conversion vessel 10 and reconditioner 11 placed side by side. A supply hopper 12 is positioned above vessel 10 and conveyors 13 and 14 are provided to transfer contact material from converter 10 to reconditioner 11 and from reconditioner 11 to supply hopper 12. The specific reconditioner shown in Figure 1 is a regenerator adapted to regenerate contaminant-bearing catalyst granules. It is equipped with a catalyst inlet 15 and catalyst outlet 16 bearing flow control valve 17. A gas inlet 18 for oxygen-containing gas is provided in the lower section of regenerator and a flue gas outlet 19 extends from the upper section thereof. Heat transfer tubes (not shown) are provided within the regenerator and have inlet 20 and outlet 21. It should be understood that the form of the reconditioner shown is merely one of numerous forms, well known to the prior art, which may be used. For example, if the operation is one wherein the contact material is inert in character, vessel 11 may broadly take the form of a heater adapted to heat the contact material to a temperature which will support the desired conversion. Returning to hopper 12, conduit 22 extends downwardly from the bottom of the hopper into a seal chamber 23. Extending from the bottom of the seal chamber into the upper section of vessel 10 is a conduit 24, having a slide valve 70 thereon above vessel 10. Conduit 24 flares outwardly in its lower end within vessel 10 as is shown in Figure 2. Conduit 25 extends laterally into the vessel at a level immediately below the lower end of pasage 24 and terminates at a point just short of the discharge opening 26 of conduit 24. A plurality of baffles 27 are spaced apart across vessel 10 at a level below the lower end of 24.

In operation, a downwardly gravitating, substantially compact column of granular contact material 28 is maintained within the lower section of conversion zone 10. The upper surface of column 28 is controlled by a level controlling device at a level substantially below the upper end of zone 10 and below baffles 27 so as to define a gas plenum space 29 above the column in the upper section of zone 10. A suitable level control device is illustrated in Figure 1 and described in U. S. Patent No. 2,458,162. It consists of two spaced-apart vertical condenser plates 30 and 31 supported in vessel 10 so as to extend vertically along a short section of the vessel corresponding roughly to the range of levels within which it is desired to maintain the surface level of column 28. Contact material fills in the space between 30 and 31 and on a change in level causes a change in the dielectric resistance between the plates. The plates are connected to a suitable controller 32 which acts to operate flow control valve 33 in contact material withdrawal passage 34 to raise or lower the flow of contact material therethrough and thereby control the level of column 28 in response to the dielectric resistance across 30 and 31.

Contact material at a temperature suitable to supply at least a major portion of the heat required by the conversion reaction gravitates from hopper 12 into seal zone 23 through passage 22. A pressure of inert gas, such as steam or flue gas, is maintained in zone 23 above the pressure in the upper section of conversion zone 10. Seal gas is admitted to zone 23 through conduit 35 at a rate controlled by diaphragm valve 36 which in turn is controlled by differential pressure controller 37. Slide valve 70 is normally open and a stream of contact material gravitates from the lower section of zone 23 through passage 24 into conversion zone 10 at a level substantially above the upper surface of column 28. The lower end 26 of passage 24 is of restricted area so that contact material is maintained as a compact stream within passage 24. A stream of vaporized hydrocarbon charge at a temperature substantially below the temperature of the contact material in passage 24 passes laterally into the conversion zone through passage 25 and is discharged into a mixing zone immediately in front of 25 and substantially above the upper surface of column 28 where it strikes the contact material from 24 and mixes therewith so that the temperatures of the stream of contact material and the stream of vaporized charge become substantially the same, or equal. The terms "substantially the same," "substantially equal," and the like, when referred to the contact material and vapor streams, are used in describing and claiming this invention to indicate that the temperatures are within 50° F. and preferably within 10° F. of each other. Some of the contact material from 24 is displaced laterally by the velocity of the vapor stream. There is, however, no substantial lifting or elevation of the contact material by the vapor stream. The mixture of contact material and vapor passes downwardly through plenum space 29 onto the surface of column 28. The falling contact material and vapor are baffled by baffles 27 and thereby caused to fall uniformly through the horizontal cross-section of the plenum space and be supplied uniformly across the upper surface of column 28. Since the contact material and vapor are at substantially the same temperature when supplied to the column, there will be no temperature gradient across the column. The vaporized charge is passed through column 28 to effect the desired conversion to lower boiling products. These products are withdrawn from the lower section of zone 10 and column 28 through conduit 38. The products may be disengaged from the contact material column by any of a number of suitable arrangements, such as those shown in Simpson et al., U. S. Patent No. 2,336,041, or Fahnestock, U. S. Patent No. 2,362,621. Used contact material is purged free of vapors by an inert purge gas, such as steam or flue gas admitted through conduit 39 and then introduced to the top of regenerator 11 by means of conduit 34, conveyor 13 and conduit 15. The contact material passes through zone 11 as a substantially compact column and is contacted by an upflowing, oxygen-containing gas, such as air, admitted through conduit 18 which burns off carbonaceous contaminants deposited on the contact material during the conversion reaction. Flue gas is removed through passage 19. The burning in zone 11 liberates large amounts of heat. The temperature of the contact material is, therefore, controlled below heat damaging levels by circulation of heat transfer fluid through the heating coils in the regenerator. The contact material is discharged from zone 11 at a temperature suitable to supply at least a major portion of the heat for the conversion reaction and transported to hopper 12 by conveyor 14.

Figure 3 illustrates a modification of the method of this invention as applied to the upper section of conversion zone 10 of a hydrocarbon conversion process. Two separate vaporized hydrocarbon charge streams pass laterally into plenum space 29, at a level substantially above the contact material column, through passages 40 and 41 in opposite directions and along opposite edges of zone 10. Separate contact material streams 42 and 43 are gravitated into each of the vapor streams as they issue from 40 and 41. The contact material streams are at a temperature suitable to supply a major portion of the heat of the conversion reaction and substantially above the temperature of the vaporized charge. Two mixtures of contact materials and vaporized charge result with the two components of each being at substantially the same temperature. The mixtures pass laterally and downwardly through the plenum space 29 and become mixed. This mixing is aided by the rotational motion given to the vapors in plenum space 29 by the streams issuing from 40 and 41 and this rotational motion also tends to cause contact material and vapors to fall uniformly through space 29 and be distributed uniformly across the upper surface of the column of contact material in zone 10. The process then proceeds as described above in connection with Figure 1.

Figure 4 illustrates another modification of this invention applied to a hydrocarbon conversion process in which the mixing zone is exterior to the conversion zone. A stream of vaporized hydrocarbon charge is passed laterally through confined passage 44 at a level substantially above the upper surface of contact material column 28. A downwardly gravitating stream of contact material 45 at a temperature suitable to supply at least a major portion of the heat of reaction and substantially above the temperature of the stream in 44, is injected into the charge stream and mixed therewith so that the temperatures of the two streams become equal and contact material is carried laterally into plenum space 29. The mixture is passed downwardly through plenum space 29 onto the upper surface of column 28. Baffle 46 is provided to direct the contact material toward the center of column 28.

Figure 5 illustrates approximately the same arrangement as Figure 4 with the addition of a downwardly sloping passage 47 on the end of passage 44 to insure that all of the mixture is delivered centrally of contact material column 28.

Figure 6 illustrates another apparatus for the conversion of hydrocarbons capable of performing the method of this invention. There is shown therein the upper section of a conversion vessel 10. Extending across the upper section of the vessel is a transverse partition 48 which divides the vessel into a seal zone 49 thereabove and a conversion zone 50 therebelow. An accumulation of contact material 51, at a temperature suitable to supply at least a major portion of the heat of the conversion reaction, is maintained within zone 49. Accumulation 51 is supplied with contact material through conduit 52 and inert seal gas is supplied to zone 49 at a pressure slightly above that in zone 50 through conduit 53. A plurality of contact material supply conduits 54 depend downwardly from partition 48 a substantial distance into conversion zone 50 and act to transfer contact material as a plurality of substantially compact streams from accumulation 51 to the upper surface or contact material column 28 in the lower section of zone 50. Conduits 54 act to maintain the surface level of column 28 relatively constant, since the flow therethrough is throttled only by the surface level of 28. A gas plenum space 29 is defined in the upper section of zone 50 above column 28. An enclosed mixing zone 55 is maintained within plenum space 29 at a level a substantial distance above the upper surface of column 28. Mixing zone 55 consists of an open bottomed vessel with a plurality of mixing baffles 56 spaced across its open lower end. Contact material gravitates as a plurality of substantially compact streams from accumulation 51 into the upper section of zone 55 by means of passages 57. Flow restricting orifice plates 58 are maintained at the lower ends of passages 57 so that the streams of contact material thereabove will be compact. Vaporized hydrocarbon charge, at a temperature substantially below the contact material temperature, enters the top of zone 55 through passage 58 and fills the mixing zone. Contact material drops from passages 57 through the vaporized charge in zone 55 and becomes mixed therewith. The mixture is discharged from zone 55 and passes uniformly through plenum space 29 onto the upper surface of column 28, after which the process continues as described in connection with Figure 1. Baffles 56 at the lower end of mixing zone 55 cause the contact material and charge issuing from 55 to be distributed across the horizontal cross-section of plenum space 29 and to fall uniformly therethrough onto the upper surface of 28.

Figure 7:
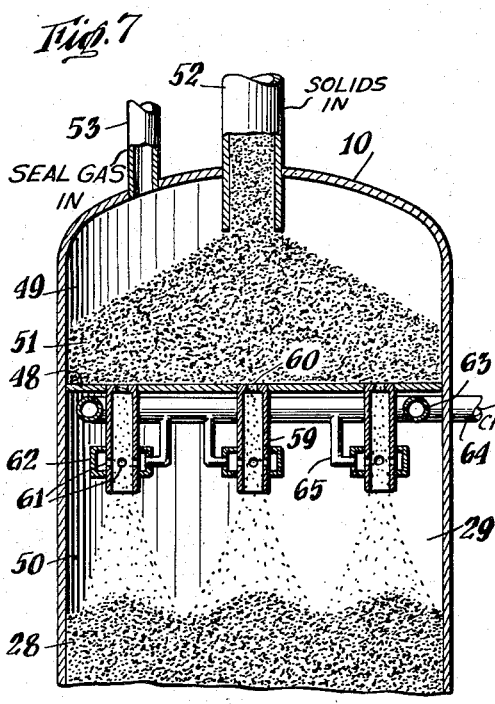
Figure 7 is an elevational view, partially in section, of a reaction vessel employing a further modified form of this invention.

Another hydrocarbon conversion system operated according to the method of this invention is shown in Figure 7. Partition 48 divides vessel 10 into seal zone 49 and conversion zone 50. A plurality of passages 59 depend downwardly from partition 48 to a common vertical level within zone 50. Contact material column 28 is maintained with its upper surface a substantial distance below the lower ends of 59 so as to define plenum space 29 above column 28. Flow restricting orifice plates 60 are maintained at the upper ends of passages 59. Hot contact material gravitates from accumulation 51 downwardly through passages 59 as a plurality of freely falling streams. A plurality of orifices 61 penetrate each passage 59 at a common level intermediate the upper and lower ends of the passage. An enclosed chamber 62 is fixed about each group of orifices 61. Vaporized charge passes into a ring header 63 through passage 64. Vaporized charge passes from header 63 into each of chambers 62 through passages 65. The vaporized charge is then injected as a plurality of laterally flowing streams into the freely falling contact material stream in passages 59. Vaporized charge and contact material mix while passing through the lower sections of passages 59 so that the temperatures of the contact material and charge become substantially the same. The mixture passes through plenum space 29 onto contact material column 28. The process then proceeds as previously described. A sufficient number of passages 59 are used to provide for uniform distribution of contact material across the horizontal cross-section of 29 and therefore uniform supply to the upper surface of 28.

Figure 8:
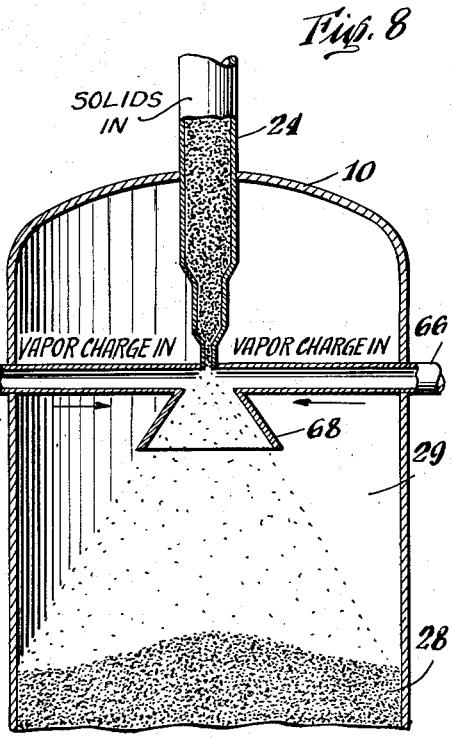
Figure 8 is an elevatinal view, partially in section, of a reaction vessel employing a still further modified form of this invention.

A further modification applied to a hydrocarbon conversion process is shown in Figure 8. Two streams of vaporized charge pass laterally into conversion zone 10 and impinge on each other within a confined mixing zone 67 which is maintained at a level substantially above the upper surface of column 28. Hot contact material is gravitated into zone 67 at about the point where streams 66 and 67 impinge, which results in a thorough mixing of the contact material and charge with resultant substantial equalization of the temperatures of the charge and contact material. The mixture is then discharged downwardly from the mixing zone through plenum space 29 onto the upper surface of column 28. It is preferable in this modification that the vapor charge passages 66 and 67 and the contact material charge passage 24 be of the shape of the vapor and contact material charge passages of Figures 1 and 2 so that a larger mixing area is provided.

Figure 9:
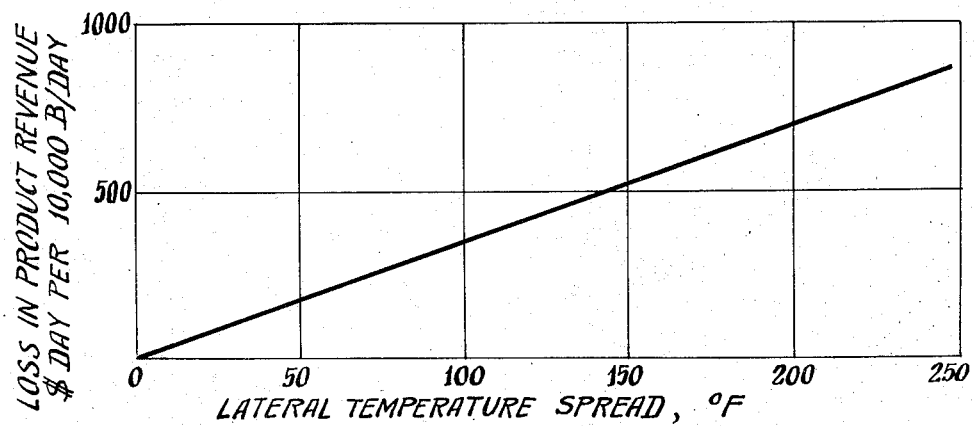
Figure 9 is a graph, illustrating the loss in product revenue that results when there are temperature gradients across the reaction bed.

As previously stated, any of the various modifications described above apply equally well to conversion reactions other than hydrocarbon conversions and also to processes wherein the contact is at a lower temperature than the gaseous reactant. The magnitude of the losses which occur due to temperature gradients across the reaction bed in catalytic hydrocarbon conversion systems of the type previously discussed is illustrated by Figure 9, which is a graph of temperature gradient across the reaction bed at a level 2½ feet below the upper surface against decline in value of the products of the process in dollars per day per 10,000 barrels of daily hydrocarbon charge to the process. It is evident from this graph that the temperature gradient has a marked effect upon the value of the products realized.

When this invention is used for hydrocarbon conversions wherein the contact material supplies a major portion of the heat required by the conversion reaction, the contact material should be heated, before entering the conversion zone, to a temperature sufficient to supply the required heat without falling below the desired conversion temperature. Where the contact material operates as a catalyst for the reaction, the temperature thereof on introduction should generally be within the range about 900° F. to 1250° F. Where the contact material serves merely as a heat carrier for a thermal cracking or coking reaction, its charging temperature may range as high as 1700° F. The hydrocarbon charge should be substantially entirely vaporized and should be introduced at a temperature within the range about 650° F. to 900° F. where the system is a catalytic conversion system. Where the system is a thermal conversion system, the vapor charge temperature may be about 1000° F. to 1150° F. However, in other processes it may be desirable to charge vapors at temperatures as low as 250° F. or even 100° F. The ratio of contact material to vaporized charge introduced into the conversion zone of hydrocarbon conversion systems should generally be within the range about 0.5 to 20 parts of contact material per part of oil by weight.

It is preferable that all of the contact material to be charged to the contact material column be passed first to the mixing zone. However, some of the contact material may be passed directly to the column as shown in Figure 6, provided that not more than about 25 percent of the total contact material flow bypasses the mixing zone so that a major portion of the contact material will be mixed with vaporized charge. The vaporized charge should be supplied to the mixing zone at a velocity sufficient to provide for uniform mixing with the contact material. The velocity should not be so high, however, that it throws a significant amount of contact material against the reactor walls and thereby causes breaking of the contact material particles. Thus, the proper velocity for the vapor supplied to the mixing zone will depend on the lateral dimensions of the reactor. Generally, for commercial size reactors a velocity within the range about 5 to 150 feet per second and preferably 25 to 80 feet per second is desirable. The vapor stream should be so directed that the contact material in the mixing zone is displaced laterally or on a downward incline if at all. The contact material should not be lifted or elevated to any substantial degree by the charge. Generally, the mixing zone should be at a level about 5 feet to 20 feet above the contact material column. Contact material should gravitate into the mixing zone but it may do so as either a substantially compact or freely falling stream.

This invention should be understood to cover all changes and modifications of the examples of the invention herein chosen for purposes of disclosure which do not constitute a departure from the spirit and scope of the invention.

I claim:

1. A continuous process for the conversion of gaseous reactants in the presence of a moving mass of granular contact material maintained within a confined conversion zone, which comprises: gravitating at least 75 percent of the total granular contact material supply for said conversion zone into a mixing zone, supplying the total gaseous reactants to be supplied to said conversion zone to said mixing zone at a temperature at least 50° F. different from the temperature of the contact material supplied to the mixing zone and thoroughly mixing contact material and gaseous reactants in said mixing zone whereby the temperatures of substantially all of the contact material and substantially all of the reactant are brought within at least 50° F. of each other, passing contact material and reactant from the mixing zone downwardly through a plenum space and onto the surface of a substantially compact bed of contact material maintained within a confined conversion zone with upper surface at a level below the mixing zone, passing the reactant downwardly through said bed to effect the desired conversion, removing the products of conversion from said bed and removing contact material from the lower section of said bed.

2. A continuous process for the conversion of gaseous reactants in the presence of a moving mass of granular contact material maintained within a confined conversion zone, which comprises: gravitating at least 75 percent of the total granular contact material supply for said conversion zone into a mixing zone, supplying the total substantially entirely gaseous reactant to be supplied to said conversion zone in the gaseous phase to said mixing zone at a temperature at least 50° F. below the temperature of the contact material supplied to the mixing zone, thoroughly mixing contact material and gaseous reactant in said mixing zone whereby the temperatures of substantially all of the contact material and substantially all of the reactant are brought within at least 50° F. of each other, passing the mixed contact material and reactant from the mixing zone downwardly through a plenum space and causing the mixture to fall through the plenum space uniformly across the horizontal cross-sectional area of the plenum space and uniformly onto the upper surface of a substantially compact bed of contact material within a confined conversion zone, the upper surface of said bed being at a level below said mixing zone, passing the reactant downwardly through said bed to effect the desired conversion, removing the products of conversion from the lower section of said bed and removing contact material from the lower section of said bed.

3. A continuous process for the conversion of vaporized hydrocarbons in the presence of a moving mass of granular contact material maintained within a confined conversion zone, which comprises: gravitating at least 75 percent of the total granular contact material supply for said conversion zone at a temperature suitable to supply a major portion of the heat for the conversion reaction into a mixing zone, supplying the total hydrocarbon charge for said conversion zone as a substantially entirely vaporized hydrocarbon charge to said mixing zone at a temperature at least 50° F. below the temperature of the contact material supplied to the mixing zone and thoroughly mixing contact material and hydrocarbon charge in said mixing zone whereby the temperatures of substantially all of the contact material and substantially all of the hydrocarbon charge are brought within at least 50° F. of each other, passing contact material and hydrocarbon charge after mixing downwardly through a plenum space and onto the surface of a downwardly moving substantially compact bed of contact material maintained within a conversion zone with upper surface at a level below the mixing zone, passing the vaporized hydrocarbon charge downwardly through said bed to effect the desired conversion, removing products of conversion from the lower section of said bed and removing used contact material from the lower section of said bed.

4. A continuous process for the conversion of a hydrocarbon charge substantially entirely in the vapor phase in the presence of a moving mass of granular contact material, which comprises: maintaining a downwardly moving, substantially compact column of granular contact material within the lower section of a confined conversion zone, maintaining a gas plenum space above said column in the upper section of said zone, gravitating at least 75 percent of the total contact material supply for said conversion zone as a stream of contact material at a temperature suitable to supply a major portion of the heat required by the conversion reaction into a confined mixing zone, supplying the total hydrocarbon charge for said conversion zone as a vapor at a temperature over 50° F. below the contact material supply temperature to said mixing zone and thoroughly mixing said vaporized charge therein with said contact material whereby the temperatures of substantially all of the contact material and substantially all of the vaporized charge are brought within 50° F. of each other, passing the mixture of charge and contact material from said mixing zone downwardly through said plenum space and onto the upper surface of said column, and causing the mixture to fall substantially uniformly across the horizontal cross-sectional area of said plenum space so that the mixture will be distributed substantially uniformly across the upper surface of said column, passing the vaporized charge through said column to effect the desired conversion, removing products of the conversion from the lower section of said column and removing contact material from the lower section of said column.

5. A continuous process for the conversion of high boiling vaporized hydrocarbons to lower boiling products in the presence of a moving mass of granular contact material, which comprises: maintaining a downwardly moving, substantially compact column of granular contact material within the lower section of a confined conversion zone, maintaining a gas plenum space above said column in the upper section of said zone, gravitating at least 75 percent of the total contact material supply for said conversion zone as a stream of contact material at a temperature suitable to supply a major portion of the heat for the conversion reaction into the upper section of said zone and into said plenum space to a level substantially above said column, thoroughly mixing said stream of contact material at said level with the total hydrocarbon charge for said conversion zone in the vapor phase and at a temperature at least 50° F. below the temperature of said stream of contact material whereby the temperatures of substantially all of the contact material and substantially all of the vaporized charge are brought within about 50° F. of each other, passing the contact material and charge after mixing through said plenum space and onto the upper surface of said contact material column, passing the vaporized charge downwardly through said column to effect the desired conversion to lower boiling products, removing said products from the lower section of the conversion zone separately of the contact material, and removing contact material from the lower section of said column.

6. A continuous process for the conversion of high boiling vaporized hydrocarbons into lower boiling hydrocarbon products in the presence of a substantially compact moving column of granular contact material, which comprises: maintaining a downwardly gravitating, substantially compact column of granular contact material within the lower section of a confined conversion zone, maintaining a gas plenum space above said column, gravitating fresh granular contact material at a temperature sufficient to supply at least a major portion of the heat for the desired conversion reaction into a confined mixing zone exterior to said conversion zone and at a level above the upper surface of said column, passing a stream of vaporized hydrocarbon charge at a temperature level substantially below the temperature of the contact material stream into said mixing zone and mixing the charge therein with the fresh contact material whereby the temperatures of the contact material and the charge become substantially the same, passing the mixed charge and contact material into said conversion zone from said mixing zone at a level above the upper surface of said column and downwardly through said plenum space onto the upper surface of said column, passing vaporized charge downwardly through said column to effect the desired conversion to lower boiling products, removing said products from the lower section of the conversion zone and removing used contact material from the lower section of the conversion zone.

7. A continuous process for the conversion of high boiling hydrocarbons substantially entirely in the vapor phase to lower boiling hydrocarbons in the presence of a downwardly moving, substantially compact column of granular contact material, which comprises: maintaining a downwardly moving, substantially compact column of granular contact material within the lower section of a confined conversion zone, maintaining the upper surface of said column at a level below the upper end of said zone whereby a gas plenum space is defined above said column, passing the total hydrocarbon charge to said zone as a stream of vaporized hydrocarbon charge laterally into said plenum space, injecting the total contact material charge to said zone as a downwardly gravitating stream of contact material at a temperature suitable to supply at least a major portion of the heat for the conversion reaction and at least 50° F. above the temperature of the vaporized charge into said vapor stream and thereby mixing the two streams so that the temperatures of substantially all of the contact material and vaporized charge are brought within at least 50° F. of each other, passing the mixture downwardly through the plenum space and onto the upper surface of the contact material column, passing the vaporized charge through the column to effect the desired conversion to lower boiling products, removing the products from the lower section of the conversion zone and removing contact material from the lower section of the conversion zone.

8. A continuous process for the conversion of high boiling hydrocarbon charge substantially entirely in the vapor phase to lower boiling hydrocarbon products in the presence of a moving, substantially compact column of granular contact material, which comprises: maintaining a downwardly gravitating, substantially compact column of granular contact material within the lower section of a confined conversion zone, controlling the surface level of said column so as to maintain it below the upper section of said zone and define a gas plenum space above said column in the upper section of said zone, gravitating the total contact material supply to said zone as a substantially compact stream of granular contact material at a temperature suitable to supply at least a major portion of the heat for the conversion reaction into said plenum space through a substantially vertical passage terminating in said plenum space at a level a substantial distance above said column, passing the total hydrocarbon charge to said zone as a stream of vaporized hydrocarbon charge at a temperature at least 50° F. below the temperature of the stream of contact material laterally into said plenum space through a substantially horizontal passage terminating at a level directly below the lower end of said vertical passage, discharging the stream of contact material downwardly from said vertical passage, discharging the stream of vaporized hydrocarbon charge from said horizontal passage laterally against said stream of contact material whereby the two streams are mixed and the temperatures of the contact material and vaporized charge are brought within at least 50° F. of each other, passing the mixture of contact material and vaporized charge downwardly through the plenum space and onto the upper surface of said column, baffling the charge and contact material as they fall through said plenum space so as to distribute them uniformly across the horizontal cross-section of said column and supply them uniformly to the upper surface of said column, passing the vaporized charge downwardly through the column to effect the desired conversion to lower boiling products, removing the products from the lower section of the column separately of the contact material, and removing contact material from the lower section of the column.

9. A continuous process for the conversion of high boiling vaporized hydrocarbon charge to lower boiling products in the presence of a moving column of granular contact material, which comprises: maintaining a downwardly moving, substantially compact column of granular contact material within the lower section of a confined conversion zone, maintaining a gas plenum space above said column in the upper section of said conversion zone, gravitating a stream of contact material at a temperature suitable to supply a major portion of the heat for the conversion reaction into a laterally flowing stream of vaporized hydrocarbon charge at a temperature substantially below the contact material temperature and at a level above the column whereby the contact material and charge streams are mixed and the temperatures of the contact material and vaporized charge become substantially equal, gravitating a second stream of granular contact material at a temperature suitable to supply the heat of the conversion reaction into a second laterally flowing vaporized hydrocarbon charge stream at a temperature substantially below the contact material temperature and at a level above said column whereby the second contact material stream and the second charge stream are mixed and the temperatures of the contact material and charge become substantially equal, directing the first-named mixture of contact material and vaporized charge laterally along one edge of the conversion zone at a level substantially above the upper surface of the contact material column in the plenum space, directing the second-named mixture of contact material and charge laterally along the edge of conversion zone opposite the edge along which the first-named mixture is directed and in an opposite direction to said first-named mixture whereby the two mixtures pass laterally and downwardly uniformly through the plenum space and uniformly onto the contact material column and become mixed so as to be about the same temperature, passing the vaporized charge through the column to effect the desired conversion to lower boiling products, removing the products from the lower section of said column separately of the contact material, and removing contact material from the lower section of said column.

10. A continuous process for the conversion of high boiling vaporized hydrocarbons to lower boiling hydrocarbons in the presence of a moving compact mass of granular contact material, which comprises: maintaining a substantially compact column of granular contact material within the lower section of a confined conversion zone, maintaining a gas plenum space above said column in upper section of said conversion zone, passing a stream of vaporized hydrocarbon charge laterally through a confined passage into said plenum space at a level substantially above the upper surface of said column, injecting a downwardly gravitating stream of contact material at a temperature suitable to supply at least a major portion of the heat of the conversion reaction and above the temperature of said vaporized charge into said charge stream in said confined passage before it enters said plenum space whereby said contact material will mix thoroughly with said vaporized charge so that the temperatures of contact material and charge become equal and contact material is carried laterally into said plenum space through said confined passage, discharging mixed contact material and charge from said passage at a level substantially above said bed and passing said mixture downwardly through said plenum space and onto upper surface of said column, passing vaporized charge through said column to effect the desired conversion to lower boiling products, removing said products from the lower section of said column separately of the contact material and removing contact material from the lower section of said column to promote downward movement of the contact material through the column.

11. A continuous process for the conversion of high boiling vaporized hydrocarbon charge to lower boiling gaseous products in the presence of a moving, substantially compact column of granular contact material, which comprises: maintaining a substantially compact column of granular contact material within the lower section of a confined conversion zone, removing contact material from the lower section of said column to promote downward movement of the contact material through the column, maintaining a gas plenum space above said column in the upper section of said conversion zone, passing a stream of vaporized hydrocarbon charge laterally through a confined passage into said conversion zone at a level in said plenum space substantially above the upper surface of said column, injecting a downwardly gravitating stream of contact material at a temperature suitable to supply at least a major portion of the heat required to effect the desired conversion reaction and substantially above the temperature of said charge stream into said charge stream before it enters said zone whereby the two streams are mixed and the temperatures of the two streams become substantially equal and contact material will be transported laterally into said zone, passing said mixture of contact material and charge after entering said zone downwardly through a downwardly sloping confined passage to a level centrally above said column, discharging said mixture from said passage onto the upper surface of said column, passing the vaporized charge through said column to effect the desired conversion to lower boiling products and removing said products from the lower section of said column separately of the contact material.

12. A continuous process for the conversion of high boiling vaporized hydrocarbon charge to lower boiling products in the presence of a downwardly gravitating, substantially compact column of granular contact material, which comprises: maintaining the substantially compact column of granular contact material within the lower section of the confined conversion zone, maintaining a gas plenum space above said column in the upper section of said conversion zone and maintaining a confined mixing zone within said plenum space at a level substantially above said column, maintaining an accumulation of contact material at a temperature suitable to supply at least a major portion of the heat required by the conversion reaction above said conversion zone, supplying contact material continuously to said accumulation, gravitating a plurality of laterally confined streams downwardly from said accumulation into the upper section of said mixing zone, discharging contact material from said streams so that the contact material falls freely through the mixing zone, passing vaporized hydrocarbon charge at a temperature substantially below the temperature of the contact material into the upper section of the mixing zone and downwardly therethrough with the falling contact material whereby the contact material and vaporized charge will be mixed and the temperatures of the contact material and vaporized charge will be equalized, baffling the flow of vaporized charge and contact material at the lower end of said mixing zone to insure thorough mixing and to distribute charge and contact material uniformly across said plenum space, passing the mixture of contact material and charge downwardly from the lower section of said mixing zone uniformly through said plenum space onto the upper surface of said column, passing the vaporized charge through said column to effect the desired conversion to lower boiling products, removing the lower boiling products from the lower section of said conversion zone and removing contact material from the lower section of said column.

13. A process for the conversion of high boiling vaporized hydrocarbon charge to lower boiling hydrocarbons in the presence of a moving column of contact material, which comprises: maintaining a downwardly gravitating, substantially compact column of granular contact material within the lower section of a confined conversion zone, maintaining a gas plenum space above said column in the upper section of the conversion zone, maintaining a confined accumulation of contact material at a temperature suitable to supply at least a major portion of the heat required for the conversion reaction above said conversion zone, supplying contact material to said accumulation, gravitating a plurality of streams of contact material from said accumulation through a plurality of laterally confined passages terminating within said plenum space at a level substantially above said column, injecting a plurality of streams of vaporized hydrocarbon charge at a temperature substantially below the temperature of the contact material into each of said contact material streams in said passages at a level intermediate the top and bottom of said passage and passing the charge downwardly through the lower section of said passage with the contact material whereby contact material and vaporized charge will be mixed in each of said passages and the temperatures of the charge and contact material will become substantially the same, discharging the mixtures of contact material and vaporized charge from the lower ends of said passages and passing the mixtures downwardly through said plenum space onto the upper surface of said column whereby contact material and charge are supplied uniformly across the upper surface of said column, passing the vaporized charge through said column to effect the desired conversion to lower boiling products, removing said products from the lower section of the conversion zone and removing contact material from the lower section of said column.

14. A continuous process for the conversion of high boiling vaporized hydrocarbon charge to lower boiling hydrocarbon products in the presence of a moving mass of granular contact material, which comprises: maintaining a downwardly gravitating, substantially compact column of granular contact material within the lower section of a confined conversion zone, maintaining a gas plenum space above said column in the upper section of said conversion zone, gravitating the total contact material supply to said zone as a stream of granular contact material at a temperature suitable to supply at least a major portion of the heat required for the conversion reaction downwardly into a confined mixing zone maintained at a level substantially above the upper surface of said column, passing the total hydrocarbon charge to said conversion zone as two laterally flowing streams of vaporized hydrocarbon charge at a temperature at least 50° F. below the contact material temperature into the mixing zone from opposite directions so that the two vaporized charge streams impinge on each other at about the point where the contact material enters the mixing zone whereby the contact material and charge will be mixed and the temperatures of the contact material and vaporized charge are brought within at least 10° F. of each other, passing the mixture of contact material and vaporized charge from the mixing zone downwardly through the plenum space and onto the surface of the column, passing the vaporized charge through the column to effect the desired conversion to lower boiling hydrocarbon products, removing said products from the lower section of the conversion zone and removing contact material from the lower section of said column.

15. A continuous process for the conversion of high boiling vaporized hydrocarbon charge to lower boiling hydrocarbon products in the presence of a moving mass of granular contact material, which comprises: maintaining a substantially compact column of granular contact material within the lower section of a confined conversion zone, maintaining a gas plenum space above said column in the upper section of the conversion zone, removing contact material from the lower section of said column to promote downward movement of the contact material through said column, supplying contact material at a temperature suitable to supply at least a major portion of the heat required by the conversion reaction to the upper surface of said column to replenish the supply of contact material in the column, passing a major portion of the contact material needed to replenish the column into a confined mixing zone at a level above the upper surface of the column before supplying it to the column, thoroughly mixing the contact material in the mixing zone with a substantially entirely vaporized hydrocarbon charge at a temperature below the contact material temperature whereby the temperatures of the contact material and charge will become substantially equal, passing the mixture of contact material and charge through the plenum space and onto the surface of the column, passing the remainder of the contact material needed to replenish the supply in the column directly onto the surface of the column, passing the vaporized charge through the column to effect the desired conversion to lower boiling products, and removing said products from the lower section of the conversion zone.

References Cited in the file of this patent

UNITED STATES PATENTS

| | | |
|---|---|---|
| 2,561,420 | Schutte | July 24, 1951 |
| 2,574,489 | Lassiat et al. | Nov. 13, 1951 |
| 2,574,850 | Utterback et al. | Nov. 13, 1951 |
| 2,593,495 | Shimp | Apr. 22, 1952 |
| 2,661,321 | Schutte | Dec. 1, 1953 |